US 9,423,512 B2

(12) United States Patent
Sato et al.

(10) Patent No.: US 9,423,512 B2
(45) Date of Patent: Aug. 23, 2016

(54) RADIATION IMAGING APPARATUS AND RADIATION IMAGING SYSTEM

(71) Applicant: CANON KABUSHIKI KAISHA, Tokyo (JP)

(72) Inventors: Eriko Sato, Tokyo (JP); Toshio Kameshima, Kumagaya (JP); Tomoyuki Yagi, Honjo (JP); Katsuro Takenaka, Honjo (JP); Hideyuki Okada, Honjo (JP); Sho Sato, Saitama (JP); Atsushi Iwashita, Saitama (JP); Takuya Ryu, Kokubunji (JP)

(73) Assignee: Canon Kabushiki Kaisha, Tokyo (JP)

( * ) Notice: Subject to any disclaimer, the term of this patent is extended or adjusted under 35 U.S.C. 154(b) by 211 days.

(21) Appl. No.: 14/189,249

(22) Filed: Feb. 25, 2014

(65) Prior Publication Data

US 2014/0241501 A1    Aug. 28, 2014

(30) Foreign Application Priority Data

Feb. 28, 2013  (JP) ................................ 2013-040029

(51) Int. Cl.
*G01T 1/16* (2006.01)
*G01T 1/17* (2006.01)
*H04N 5/32* (2006.01)

(52) U.S. Cl.
CPC .. *G01T 1/17* (2013.01); *H04N 5/32* (2013.01)

(58) Field of Classification Search
CPC ........ H04N 5/32; H04N 5/353; H04N 5/374; H04N 5/378; A61B 6/4233
See application file for complete search history.

(56) References Cited

U.S. PATENT DOCUMENTS

| 6,952,015 | B2 | 10/2005 | Kameshima |
| 7,002,157 | B2 | 2/2006 | Kameshima |
| 7,138,639 | B2 | 11/2006 | Kameshima |
| 7,379,615 | B2 | 5/2008 | Allouche |
| 7,381,963 | B2 | 6/2008 | Endo et al. |

(Continued)

FOREIGN PATENT DOCUMENTS

| JP | 2000-183320 A | 6/2000 |
| JP | 2002-543684 A | 12/2002 |

(Continued)

OTHER PUBLICATIONS

Extended European Search Report in corresponding EP 14157069.7 dated Jun. 12, 2015 (8 pages).

(Continued)

*Primary Examiner* — Hoon Song
(74) *Attorney, Agent, or Firm* — Fitzpatrick, Cella, Harper & Scinto

(57) ABSTRACT

A radiation imaging apparatus includes a pixel array having pixels, a bias line applying a bias potential to converters of the pixels, a detection circuit which detects a current flowing to the bias line, and a control unit which detects a start of radiation irradiation to the pixel array based on an output from the detection circuit and controls a charge accumulation operation of the pixels in accordance with the detection. The detection circuit includes a differential amplifier circuit and a feedback path, and applies a potential corresponding to a reference bias potential to the bias line. The differential amplifier circuit includes a first input terminal receiving the reference bias potential, a second input terminal connected to the bias line, and an output terminal, and the feedback path connects the output terminal and the second input terminal.

11 Claims, 5 Drawing Sheets

(56) References Cited

U.S. PATENT DOCUMENTS

| | | |
|---|---|---|
| 7,386,089 B2 | 6/2008 | Endo et al. |
| 7,408,167 B2 | 8/2008 | Kameshima et al. |
| 7,421,063 B2 | 9/2008 | Takenaka et al. |
| 7,476,027 B2 | 1/2009 | Takenaka et al. |
| 7,491,960 B2 | 2/2009 | Takenaka et al. |
| 7,514,663 B2 | 4/2009 | Yagi et al. |
| 7,514,690 B2 | 4/2009 | Endo et al. |
| 7,541,591 B2 | 6/2009 | Endo et al. |
| 7,564,038 B2 | 7/2009 | Endo et al. |
| 7,573,038 B2 | 8/2009 | Yokoyama et al. |
| 7,573,041 B2 | 8/2009 | Kameshima et al. |
| 7,592,599 B2 | 9/2009 | Kameshima |
| 7,613,277 B2 | 11/2009 | Takenaka et al. |
| 7,645,995 B2 | 1/2010 | Yagi et al. |
| 7,683,337 B2 | 3/2010 | Takenaka et al. |
| 7,705,911 B2 | 4/2010 | Kameshima |
| 7,724,874 B2 | 5/2010 | Kameshima et al. |
| 7,732,776 B2 | 6/2010 | Takenaka et al. |
| 7,732,778 B2 | 6/2010 | Yokoyama et al. |
| 7,786,448 B2 | 8/2010 | Endo et al. |
| 7,791,034 B2 | 9/2010 | Kameshima et al. |
| 7,839,977 B2 | 11/2010 | Kameshima et al. |
| 7,850,367 B2 | 12/2010 | Takenaka et al. |
| 7,872,218 B2 | 1/2011 | Endo et al. |
| 7,880,145 B2 | 2/2011 | Yagi et al. |
| 7,923,696 B2 | 4/2011 | Kameshima |
| 7,965,817 B2 | 6/2011 | Kameshima et al. |
| 7,989,772 B2 | 8/2011 | Yagi et al. |
| 8,093,562 B2 | 1/2012 | Yokoyama et al. |
| 8,107,588 B2 | 1/2012 | Kameshima et al. |
| 8,167,486 B2 | 5/2012 | Takenaka et al. |
| 8,218,070 B2 | 7/2012 | Kameshima |
| 8,222,611 B2 | 7/2012 | Yagi et al. |
| 8,247,779 B2 | 8/2012 | Kameshima et al. |
| 8,723,996 B2 | 5/2014 | Yokoyama et al. |
| 8,872,118 B2 | 10/2014 | Nishino et al. |
| 8,894,280 B2 | 11/2014 | Topfer et al. |
| 2003/0086523 A1 | 5/2003 | Tashiro et al. |
| 2005/0128327 A1 | 6/2005 | Bencuya et al. |
| 2009/0272909 A1 | 11/2009 | Takenaka et al. |
| 2010/0155576 A1 | 6/2010 | Merrill |
| 2010/0277623 A1 | 11/2010 | Tejada et al. |
| 2011/0032392 A1 | 2/2011 | Litvinov et al. |
| 2011/0309262 A1 | 12/2011 | Sato et al. |
| 2011/0317054 A1 | 12/2011 | Kameshima et al. |
| 2012/0132820 A1 | 5/2012 | Iwakiri et al. |
| 2012/0132824 A1* | 5/2012 | Nishino .................. H04N 5/32 250/394 |
| 2012/0132825 A1* | 5/2012 | Amitani .................. A61B 6/00 250/394 |
| 2013/0051525 A1 | 2/2013 | Sato |
| 2013/0140467 A1 | 6/2013 | Kitano et al. |
| 2013/0240712 A1 | 9/2013 | Takenaka et al. |
| 2013/0264488 A1 | 10/2013 | Sugawara et al. |
| 2013/0264490 A1* | 10/2013 | Takenaka .................. H04N 5/32 250/394 |
| 2014/0061491 A1 | 3/2014 | Iwashita et al. |
| 2014/0112448 A1 | 4/2014 | Takenaka et al. |
| 2014/0185764 A1 | 7/2014 | Takenaka et al. |
| 2014/0239186 A1 | 8/2014 | Sato et al. |
| 2014/0239187 A1 | 8/2014 | Iwashita et al. |
| 2014/0241502 A1 | 8/2014 | Kitano et al. |
| 2014/0241506 A1 | 8/2014 | Iwashita et al. |
| 2015/0085980 A1 | 3/2015 | Kitano et al. |

FOREIGN PATENT DOCUMENTS

| | | |
|---|---|---|
| JP | 2003-576 A | 1/2003 |
| JP | 2004-130058 A | 4/2004 |
| JP | 2009-219538 A | 10/2009 |
| JP | 2010-264085 A | 11/2010 |
| JP | 2010-268171 A | 11/2010 |
| JP | 2011-185622 A | 9/2011 |
| JP | 2012-129983 A | 7/2012 |
| WO | 00/65825 A1 | 11/2000 |
| WO | 2010/150569 A1 | 12/2010 |
| WO | 2011/104991 A | 9/2011 |
| WO | 2012/008229 A1 | 1/2012 |

OTHER PUBLICATIONS

Office Action issued in Japanese Application No. 2013-040029 dated Apr. 8, 2016—5 pages.

* cited by examiner

RADIATION IMAGING APPARATUS AND RADIATION IMAGING SYSTEM

BACKGROUND OF THE INVENTION

1. Field of the Invention

The present invention relates to a radiation imaging apparatus and a radiation imaging system.

2. Description of the Related Art

A radiation imaging apparatus performs an imaging operation in synchronism with irradiation by a radiation generation apparatus. Japanese Patent Laid-Open No. 2010-268171 describes a radiation image capturing apparatus that detects irradiation and accordingly starts accumulating charges. The radiation image capturing apparatus includes a plurality of radiation detection elements arrayed in a matrix, and a plurality of bias lines each connected to the radiation detection elements of a corresponding column. The plurality of bias lines are connected to a connection line. The radiation image capturing apparatus includes a current detection means for detecting a current flowing to the connection. The current detection means detects an increase/decrease in the current that flows to the connection, thereby detecting the start or end of irradiation. In this radiation image capturing apparatus, when detection of the current flowing to the connection is unnecessary, the operation of the current detection means is stopped, and the bias power supply is connected to the connection.

In the radiation image capturing apparatus described in Japanese Patent Laid-Open No. 2010-268171, when the current flowing to the connection to which the plurality of bias lines are connected need not be detected, the bias power supply is connected to the connection and applies a bias voltage to the plurality of bias lines. Hence, noise is readily transmitted from the bias power supply to the plurality of bias lines, and noise such as line noise may occur in a captured image.

SUMMARY OF THE INVENTION

The present invention provides a new technique for controlling the potential of a bias line in a radiation imaging apparatus that detects radiation irradiation based on a current flowing to the bias line.

A first aspect of the present invention provides a radiation imaging apparatus comprising: a pixel array in which a plurality of pixels are arrayed, each of the plurality of pixels including a converter configured to accumulate charges corresponding to radiation; a bias line configured to apply a bias potential to the converters of the plurality of pixels; a detection circuit configured to detect a current flowing to the bias line; and a control unit configured to detect a start of radiation irradiation to the pixel array based on an output from the detection circuit and configured to control a charge accumulation operation of the plurality of pixels in accordance with the detection of the start of radiation irradiation, wherein the detection circuit includes a differential amplifier circuit and a feedback path and is configured to apply a potential corresponding to a reference bias potential to the bias line, the differential amplifier circuit includes a first input terminal to which the reference bias potential is applied, a second input terminal to which the bias line is connected, and an output terminal, and the feedback path connects the output terminal and the second input terminal, and an impedance of the feedback path in a detection operation of detecting radiation irradiation is higher than the impedance of the feedback path in a readout operation of a signal from the pixel array.

A second aspect of the present invention provides a radiation imaging system comprising: a radiation imaging apparatus as defined as the first aspect; and a processor configured to process a signal output from the radiation imaging apparatus.

Further features of the present invention will become apparent from the following description of embodiments with reference to the attached drawings.

DESCRIPTION OF THE EMBODIMENTS

The present invention will now be described with reference to the accompanying drawings by way of embodiments. Each of the embodiments of the present invention described below can be implemented solely or as a combination of a plurality of the embodiments or features thereof where necessary or where the combination of elements or features from individual embodiments in a single embodiment is beneficial.

Figure 1:
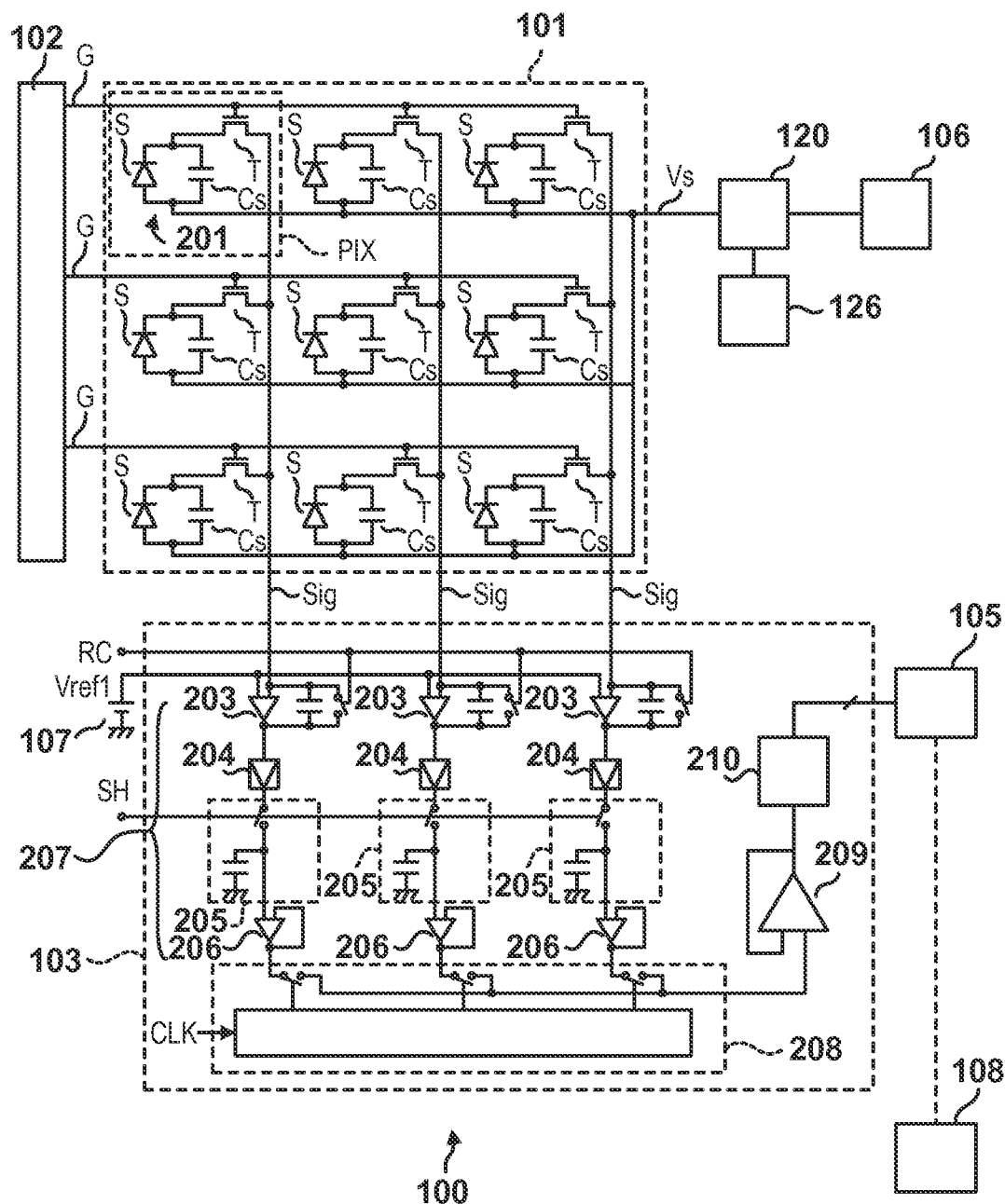
FIG. 1 is a block diagram showing the overall arrangement of a radiation imaging apparatus according to one embodiment of the present invention.

The overall arrangement of a radiation imaging apparatus 100 according to one embodiment of the present invention will be described with reference to FIG. 1. The radiation imaging apparatus 100 is configured to capture an image formed by radiation. The image can be formed by radiation emitted from a radiation source (not shown) and transmitted through a subject. The radiation can be, for example, X-rays, α-rays, β-rays, or γ-rays.

The radiation imaging apparatus 100 includes a pixel array 101, a driving circuit 102, a readout circuit 103, a detection circuit 120, a reference bias potential generation circuit 126, and a control unit 106. The radiation imaging apparatus 100 can also include a signal processing unit (processor) 105.

The pixel array 101 includes a plurality of pixels PIX two-dimensionally arrayed to form a plurality of rows and a plurality of columns. In the example shown in FIG. 1, the pixels PIX are arrayed to form 3 rows×3 columns. In fact, more pixels PIX are arrayed to form more rows and columns. Each pixel PIX includes a converter 201 that converts radiation or light into charges, and a switch element T that outputs an electrical signal corresponding to the charges to a signal line Sig.

The converter 201 can be, for example, an indirect converter including a photoelectric converter S that converts light into charges, and a wavelength converter (scintillator) that converts radiation into light having a wavelength detectable by the photoelectric converter. Alternatively, the converter 201 can be a direct converter that directly converts radiation into charges. The photoelectric converter S can be, for example, a PIN photodiode mainly formed from amorphous silicon arranged on an insulating substrate such as a glass substrate. When the photoelectric converter of the converter 201 is a PIN photodiode, the converter 201 can have a capacitor Cs.

The switch element T can be a transistor having a control terminal and two primary terminals, for example, a thin film transistor (TFT). One electrode of the converter 201 is electrically connected to one electrode of the two primary terminals of the switch element T, and the other electrode of the converter 201 is electrically connected to a common bias line Vs. The detection circuit 120 supplies a bias potential VVs to the bias line Vs.

The gate of the switch element T is connected to a driving signal line G driven by the driving circuit 102. The driving circuit 102 drives the driving signal line G of a row to be selected in the pixel array 101 to the active level. When a signal of active level is supplied to the gate of the switch element T via the driving signal line G, the switch element T changes to the conductive state. Signals corresponding to the charges accumulated in the converters 201 of the pixels PIX of the selected row are thus parallelly output to the plurality of signal lines Sig.

The signals output to the signal lines Sig are read out by the readout circuit 103. The readout circuit 103 includes a plurality of amplifier circuits 207 and a multiplexer 208. The plurality of amplifier circuits 207 are provided such that one amplifier circuit 207 corresponds to one signal line Sig. The signals of the pixels PIX of the selected row which are parallelly output to the plurality of signal lines Sig are parallelly amplified by the plurality of amplifier circuits 207.

Each amplifier circuit 207 can include, for example, an integrating amplifier 203, a variable amplifier 204 that amplifies a signal from the integrating amplifier 203, a sample and hold circuit 205 that samples and holds the signal from the variable amplifier 204, and a buffer amplifier 206. The integrating amplifier 203 can include, for example, an operational amplifier that amplifies the difference between the signal output to the signal line Sig and a reference potential Vref1 from a reference power supply 107, an integral capacitor, and a reset switch. The integrating amplifier 203 can change the amplification factor by changing the value of the integral capacitor. The signal output to the signal line Sig is supplied to the inverting input terminal of the operational amplifier, and a reference voltage Vref from the reference power supply 107 is supplied to the non-inverting input terminal. The output terminal is connected to the input terminal of the variable amplifier 204. The integral capacitor and the reset switch are parallelly connected between the non-inverting input terminal and the output terminal of the operational amplifier. The sample and hold circuit 205 can be formed from, for example, a sampling switch and a sampling capacitor.

The multiplexer 208 sequentially selects and outputs the signals parallelly read out from the plurality of amplifier circuits 207 corresponding to the plurality of signal lines Sig, respectively. The readout circuit 103 can include a buffer amplifier 209 that buffers the signal from the multiplexer 208. The buffer amplifier 209 can function as an impedance converter. The readout circuit 103 can include an A/D converter 210. The A/D converter 210 can be arranged to, for example, convert the analog signal output from the buffer amplifier 209 into a digital signal.

The signal output from the readout circuit 103 can be provided to the signal processing unit 105. The signal processing unit 105 can be configured to process the signal output from the readout circuit 103 and supply it to a computer 108. The signal processing unit 105 can be either incorporated in the radiation imaging apparatus 100 or provided as an external device of the radiation imaging apparatus 100.

The control unit 106 generates a control signal for controlling the driving circuit 102, a control signal for controlling the readout circuit 103, and the like. The driving circuit 102 changes the switch element T of each pixel PIX of a row to read out signals to the conductive state in accordance with the control signal from the control unit 106. The control signal for controlling the readout circuit 103 can include, for example, a reset signal RC, a sample and hold signal SH, and a clock signal CLK. The reset signal RC controls the reset switch of the integrating amplifier 203. The sample and hold signal SH controls the sample and hold circuit 205. The clock signal CLK controls the multiplexer 208.

Figure 2:
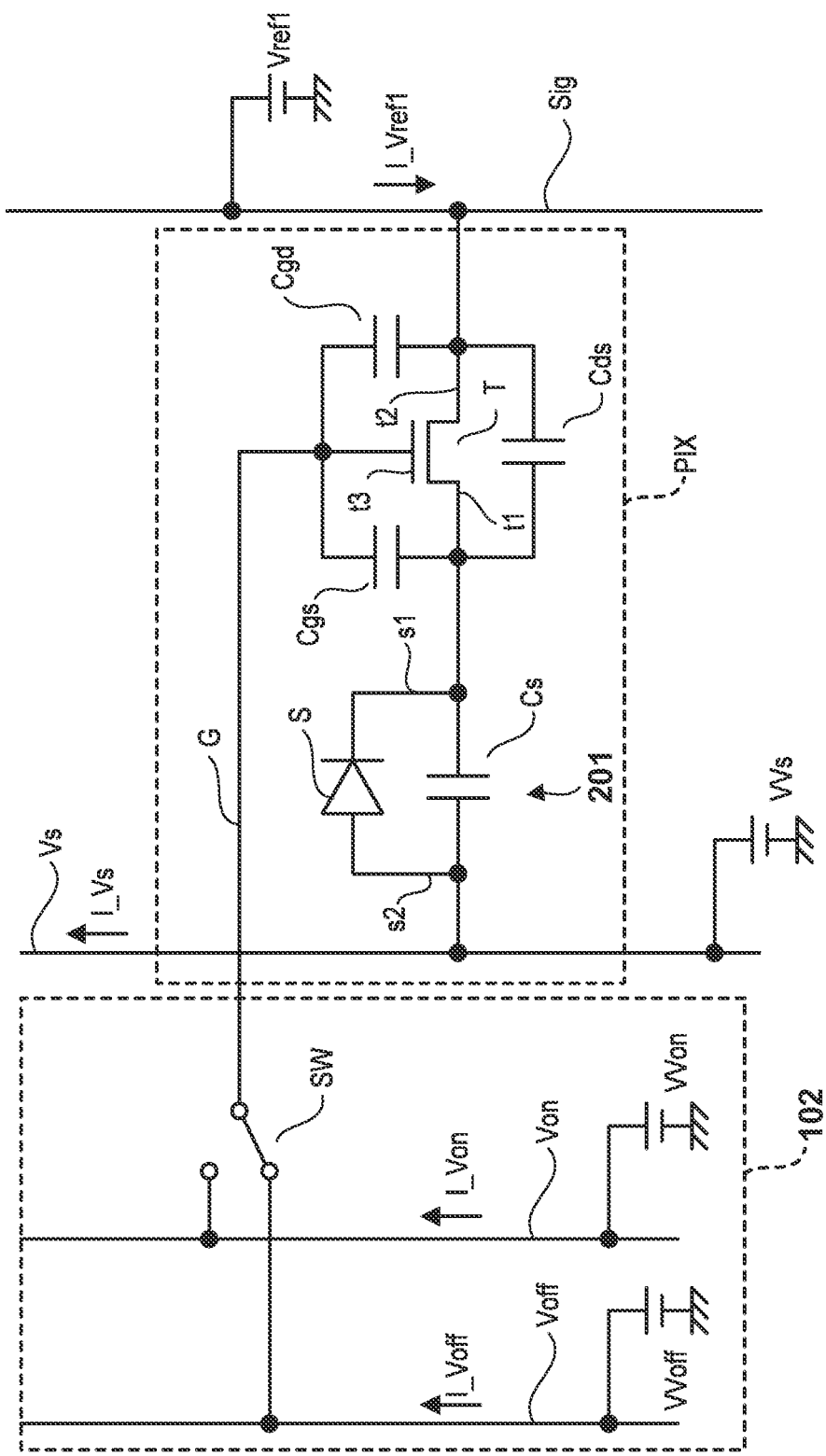
FIG. 2 is a circuit diagram for explaining a current that flows when a pixel is driven.

A current that flows when the pixel PIX is driven will be described with reference to FIG. 2. FIG. 2 illustrates one pixel PIX representative of the plurality of pixels PIX for the sake of simplicity. A first primary terminal t1 of the switch element T is connected to a first electrode s1 of the converter 201 (photoelectric converter S), and a second primary terminal t2 of the switch element T is connected to the signal line Sig. The switch element T is set in the conductive state when a driving signal of active level is supplied to a control terminal t3 via the driving signal line G. When the switch element T is set in the conductive state, a signal corresponding to charges generated in the converter 201 (photoelectric converter S) and accumulated in the capacitor Cs is output to the signal line Sig. The switch element T includes a capacitor Cgs between the control terminal t3 and the first primary terminal t1, a capacitor Cgd between the control terminal t3 and the second primary terminal t2, and a capacitor Cds between the first primary terminal t1 and the second primary terminal t2.

The signal line Sig is driven by the amplifier circuit 207 of the readout circuit 103 so as to maintain the reference potential Vref1. To set the switch element T in the conductive state, the driving signal line G is driven to a conductive power supply VVon via a conductive voltage line Von and a switch SW of the driving circuit 102. To set the switch element T in the nonconductive state, the driving signal line G is driven to a nonconductive power supply VVoff via a nonconductive voltage line Voff and the switch SW of the driving circuit 102.

A current that flows when the pixel PIX is irradiated with radiation will be described below. First, a case will be explained in which light converted from radiation irradiates the converter 201 when the switch element T is in the nonconductive state. In accordance with electron-hole pairs generated by light irradiation, the capacitor Cs of the converter 201, and the capacitors of the switch element T, a nonconductive power supply current I_Voff flows to the driving signal line G as a driving signal line current I_Vg from the nonconductive power supply VVoff toward the pixel PIX. A signal line current I_Vref1 flows to the signal line Sig from the side of the reference potential Vref1 toward the pixel PIX. A bias line current I_Vs equal to the sum of the driving signal line current I_Vg and the signal line current I_Vref1, which flow to the pixel PIX, flows to the bias line Vs from the pixel PIX toward the supply side of the bias potential Vs (detection circuit 120 to be described later).

Next, a case will be explained in which light converted from radiation irradiates the converter 201 when the switch element T is in the conductive state. The bias line current I_Vs flows to the bias line Vs from the pixel PIX toward the supply side of the bias potential Vs (detection circuit 120 to be described later). The signal line current I_Vref1 flows to the signal line Sig from the integrating amplifier 203 toward the pixel PIX. As described above, when the photoelectric converter S is irradiated with light, the bias current I_Vs corresponding to the light that irradiates the converter flows to the bias line Vs.

Figure 3:
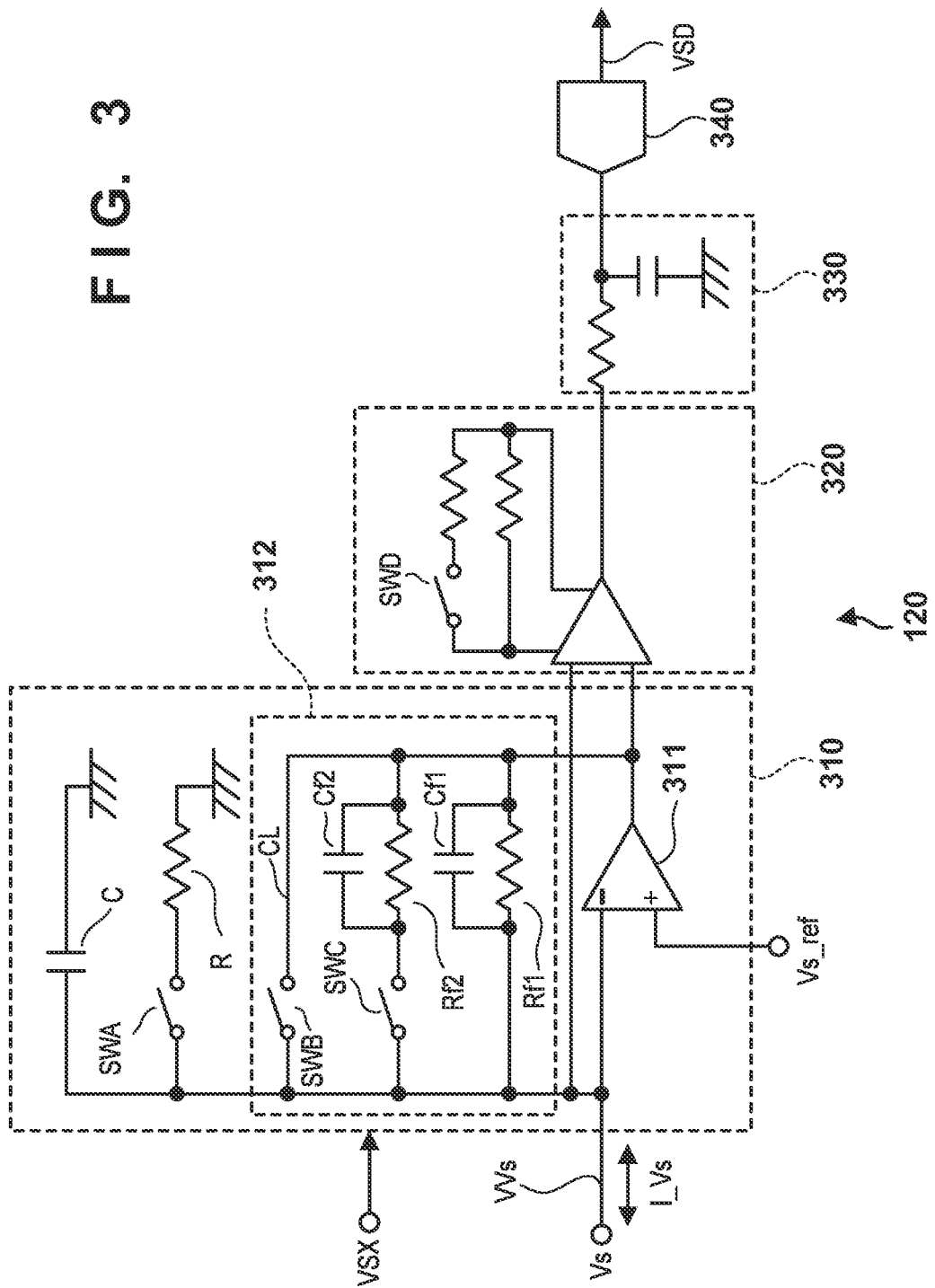
FIG. 3 is a circuit diagram showing an example of the arrangement of a detection circuit.

The detection circuit 120 will be described below with reference to FIG. 3. The detection circuit 120 detects a current flowing to a bias line Vs, and provides a bias current signal VSD representing the current to the control unit 106. The detection circuit 120 can include, for example, a current-voltage conversion amplifier 310, a voltage amplifier 320, a filter circuit 330, and an A/D converter 340. The current-voltage conversion amplifier 310 converts the current flowing to the bias line Vs into a voltage. The voltage amplifier 320 amplifies the signal (voltage signal) output from the current-voltage conversion amplifier 310. The voltage amplifier 320 can be formed from, for example, an instrumentation amplifier. The filter circuit 330 is a filter that limits the band of the signal output from the voltage amplifier 320, and can be, for example, a low-pass filter. The A/D converter 340 supplies, to the control unit 106, the bias current signal VSD that is a digital signal converted from the signal (analog signal) output from the filter circuit 330.

The detection circuit 120 or the current-voltage conversion amplifier 310 not only detects the current flowing to the bias line Vs but also supplies a potential corresponding to a reference bias potential Vs_ref given by the reference bias potential generation circuit 126 to the bias line Vs. The current-voltage conversion amplifier 310 can be a transimpedance amplifier. The current-voltage conversion amplifier 310 includes, for example, an operational amplifier 311, and a feedback path 312 arranged between the inverting input terminal (second input terminal) and the output terminal of the operational amplifier 311. The reference bias potential Vs_ref is given to the non-inverting input terminal (first input terminal) of the operational amplifier 311. The feedback path can include, for example, a first path that shorts the inverting input terminal and the output terminal of the operational amplifier 311 by a resistor Rf1, a second path that shorts the inverting input terminal and the output terminal by a resistor Rf2, and a third path that shorts the inverting input terminal and the output terminal by an electrically conductive line CL.

A phase compensation capacitor Cf1 can be connected in parallel to the resistor Rf1. A phase compensation capacitor Cf2 can be connected in parallel to the resistor Rf2. The phase compensation capacitors Cf1 and Cf2 effectively prevent, for example, the current-voltage conversion amplifier 310 from oscillating. A switch SWC can be arranged in series in the path including the resistor Rf2. A switch SWB can be arranged in series in the path formed from the electrically conductive line CL.

The control unit 106 supplies a control signal VSX to the detection circuit 120 and selects a path to be enabled out of the plurality of paths including the first path, the second path, and the third path, thereby controlling the feedback impedance. When the switch SWB is closed, the third path formed from the electrically conductive line CL is enabled, and the first path including the resistor Rf1 and the second path including the resistor Rf2 are disabled. When the switch SWB is opened, and the switch SWC is closed, the third path is disabled, and the first path and the second path are enabled.

A switch SWA and a resistor R may be arranged in series between the ground and the inverting input terminal of the operational amplifier 311. A capacitor C may be arranged between ground and the inverting input terminal of the operational amplifier 311.

The current-voltage conversion amplifier 310 includes the feedback path 312 and thus functions to generate, in the inverting input terminal (second input terminal), a potential corresponding to the reference bias potential Vs_ref given to the non-inverting input terminal (first input terminal) of the operational amplifier 311. More specifically, the current-voltage conversion amplifier 310 functions to generate, in the inverting input terminal, a potential almost equal to the reference bias potential Vs_ref given to the non-inverting input terminal of a differential amplifier circuit 311. In this case, the control unit 106 controls the impedance (to be referred to as a feedback impedance hereinafter) of the feedback path 312 of the current-voltage conversion amplifier 310.

A large feedback impedance means that the gain of the current-voltage conversion amplifier 310 is large. On the other hand, when the feedback impedance is large, the magnitude of the bias current I_Vs is limited by this, and the potential of the bias line Vs can be unstable. Hence, the feedback impedance is preferably controlled in accordance with the operation of the radiation imaging apparatus 100, for example, a detection operation of detecting radiation irradiation to the pixel array 101 or a readout operation of signals from the pixels PIX. This will be described below in more detail.

In this embodiment, the control unit 106 detects the start of radiation irradiation to the pixel array 101 based on the output from the detection circuit 120, that is, the bias current signal VSD, and accordingly controls a charge accumulation operation by the plurality of pixels PIX. That is, to quickly detect the start of radiation irradiation to the pixel array 101, the detection circuit 120 needs to detect the current flowing to the bias line Vs at a high sensitivity. Hence, in the detection operation of detecting radiation irradiation to the pixel array 101, the feedback impedance is preferably large.

On the other hand, when transferring the charges accumulated in the capacitor Cs of the converter 201 to the signal line Sig via the switch element T, if the feedback impedance is large, current supply from the bias line Vs to the side of a second electrode s2 of the converter 201 delays. In particular, when strong radiation partially strikes the pixel array 101, noise readily occurs in a captured image due to the delay of current supply from the bias line Vs to the side of the second electrode s2 of the converter 201. Hence, when transferring the charges accumulated in the capacitor Cs of the converter 201 to the signal line Sig via the switch element T, the feedback impedance is preferably made small.

The control unit 106 controls the feedback impedance such that the feedback impedance in the detection operation of detecting radiation irradiation becomes larger than that in the readout operation of signals from the pixels PIX. An example in which the resistor Rf2 has a lower resistance than that of the resistor Rf1 will be described below. In this case, when the second path including the resistor Rf2 is selected, the gain increases.

The control unit 106, for example, opens the switch SWB in the detection operation of detecting radiation irradiation, and closes the switch SWB in the readout operation of signals from the pixels PIX. In this case, the switch SWC can be either opened or closed in both the detection operation of detecting radiation irradiation and the readout operation of signals from the pixels PIX.

Alternatively, the control unit 106 opens the switch SWB and closes the switch SWC in the detection operation of detecting radiation irradiation, and closes the switch SWB in the readout operation of signals from the pixels PIX (the switch SWC can be either opened or closed because the switch SWB is closed).

The switch SWA and the resistor R are not indispensable. However, when the switch SWA and the resistor R are provided, the switch SWA can be closed during the inoperative period of the detection circuit 120, and opened in the detection operation of detecting radiation irradiation. More preferably, the inoperative period of the detection circuit 120 is the period excluding the detection operation of detecting radiation irradiation, an accumulation operation to be described later, and an image output operation. The switch SWA can be either closed or opened in the readout operation of signals from the pixels PIX. In this case, the resistor R preferably has a higher resistance than those of the resistors Rf1 and Rf2. For example, the resistor R can be set to 10 kΩ, the resistor Rf1 can be set to 1 kΩ, and the resistor Rf2 can be set to 1050Ω.

The voltage amplifier 320 can be formed as an amplifier having a variable gain. For example, the gain of the voltage amplifier 320 can be changed by closing or opening a switch SWD.

The operation of the radiation imaging apparatus 100 according to the first embodiment of the present invention will be described next with reference to FIG. 4A. The operation of the radiation imaging apparatus 100 and, more specifically, the operations of the pixel array 101, the driving circuit 102, the readout circuit 103, and the detection circuit 120 are controlled by the control unit 106. The operation of the radiation imaging apparatus 100 includes the initialization operation, the accumulation operation, and the image output operation.

The initialization operation is an operation of initializing the plurality of pixels PIX of the pixel array 101 on the row basis. The accumulation operation is an operation of accumulating charges generated by radiation irradiation in each pixel PIX of the pixel array 101. The image output operation is an operation of reading out, from the pixel array 101, a signal corresponding to the charges accumulated in each pixel PIX of the pixel array 101 by radiation irradiation to the pixel array 101 and outputting an image (image signal).

Figure 4A:
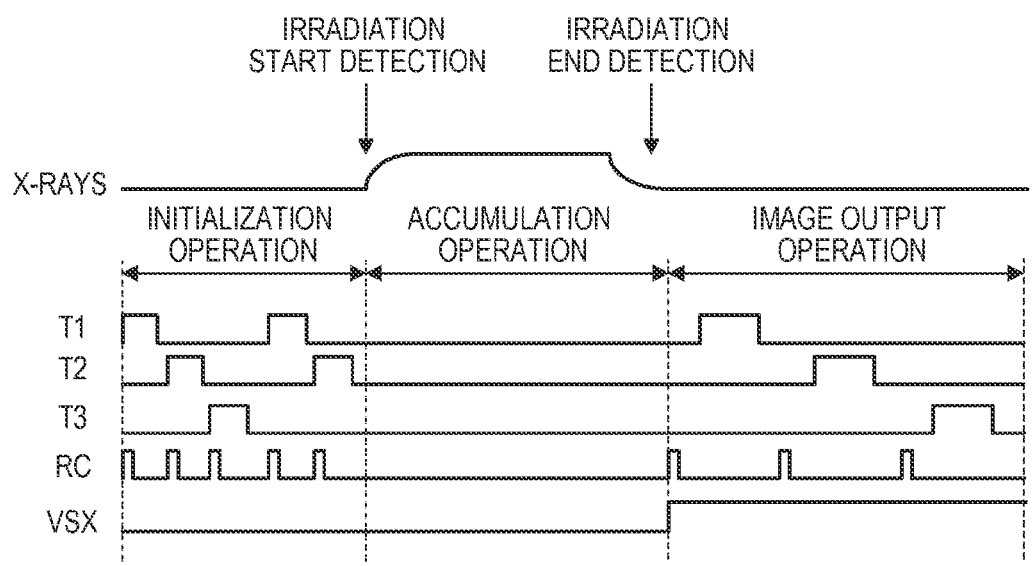
FIGS. 4A and 4B are timing charts for explaining the operations of radiation imaging apparatuses according to the first and second embodiments, respectively.

A shift from the initialization operation to the accumulation operation occurs when the control unit 106 detects the start of radiation irradiation to the radiation imaging apparatus 100 based on the output from the detection circuit 120 ("irradiation start detection" in FIG. 4A). A shift from the accumulation operation to the image output operation occurs when the control unit 106 detects the end of radiation irradiation to the radiation imaging apparatus 100 based on the output from the detection circuit 120 ("irradiation end detection" in FIG. 4A).

A more detailed operation example of the radiation imaging apparatus 100 will be described below. In the initialization operation, the control unit 106 repeats an operation of sequentially setting the driving signal lines G of the first to last rows to the active level and setting the reset signal RC to the active level. When the reset signal RC changes to the active level, the integrating amplifiers 203 are set in a voltage follower state, and the reference potential Vref1 is supplied to the signal lines Sig. In this state, the switches T of the row whose driving signal line G is set to the active level change to the conductive state, and charges accumulated in the capacitors Cs of the converters 201 are initialized.

During the period of the initialization operation and the accumulation operation, the control unit 106 performs the detection operation of detecting radiation irradiation to the pixel array 101 using the detection circuit 120. More specifically, during the period of the initialization operation and the accumulation operation, the detection circuit 120 detects the current I_Vs flowing to the bias line Vs, and supplies the bias current signal VSD representing the current to the control unit 106. The control unit 106 detects the start of radiation irradiation to the pixel array 101 based on the bias current signal VSD. The control unit 106 can detect the start of radiation irradiation to the pixel array 101 based on, for example, at least one of the instantaneous value, integrated value, and differential value of the bias current signal VSD. The control unit 106 sets the feedback impedance in the detection operation of detecting radiation irradiation to be higher than that in the readout operation of signals from the pixels PIX, as described above. In this example, the switch SWB is opened to disable the third path.

Upon detecting the start of radiation irradiation to the pixel array 101, the control unit 106 supplies a control signal to the driving circuit 102 to stop the initialization operation. Accordingly, the pixels of the pixel array 101 start the accumulation operation.

Even during the accumulation operation, the control unit 106 monitors the bias current signal VSD and detects the end of radiation irradiation to the pixel array 101 based on the bias current signal VSD. The control unit 106 can detect the end of radiation irradiation to the pixel array 101 based on, for example, at least one of the instantaneous value, integrated value, and differential value of the bias current signal VSD.

Upon detecting the end of radiation irradiation to the pixel array 101, the control unit 106 supplies a control signal to the driving circuit 102 to sequentially drive the driving signal lines G of the plurality of rows of the pixel array 101 to the active level. The signals of the pixels PIX of the row (that is, selected row) whose driving signal line G is driven to the active level are output to the signal lines Sig and read out by the readout circuit 103. Immediately before the signals of the selected row of the pixel array 101 are output to the signal lines Sig, the reset signal RC is set to the active level, and (the integral capacitors of) the integrating amplifiers 203 are reset.

Additionally, upon detecting the end of radiation irradiation to the pixel array 101, the control unit 106 sets the control signal VSX to the active level. In accordance with the change of the control signal VSX to the active level, the detection circuit 120 sets the feedback impedance to that in the readout operation of signals from the pixels PIX. That is, upon detecting the end of radiation irradiation to the pixel array 101, the control unit 106 makes the feedback impedance of the detection circuit 120 low. The control unit 106 can be configured to make the feedback impedance low during the period in which (the amplifier circuit 207 of) the readout circuit 103 is reset for the first time after detection of the end of radiation irradiation to the pixel array 101. In this example, the switch SWB is closed to enable the third path.

When the image output operation ends, the control unit 106 shifts the radiation imaging apparatus 100 from the image output operation to the initialization operation. Accordingly, the feedback impedance is set to that in the detection operation of detecting radiation irradiation to the pixel array 101. That is, the control unit 106 makes the feedback impedance of the detection circuit 120 high in accordance with the end of the image output operation (readout operation).

Figure 4B:
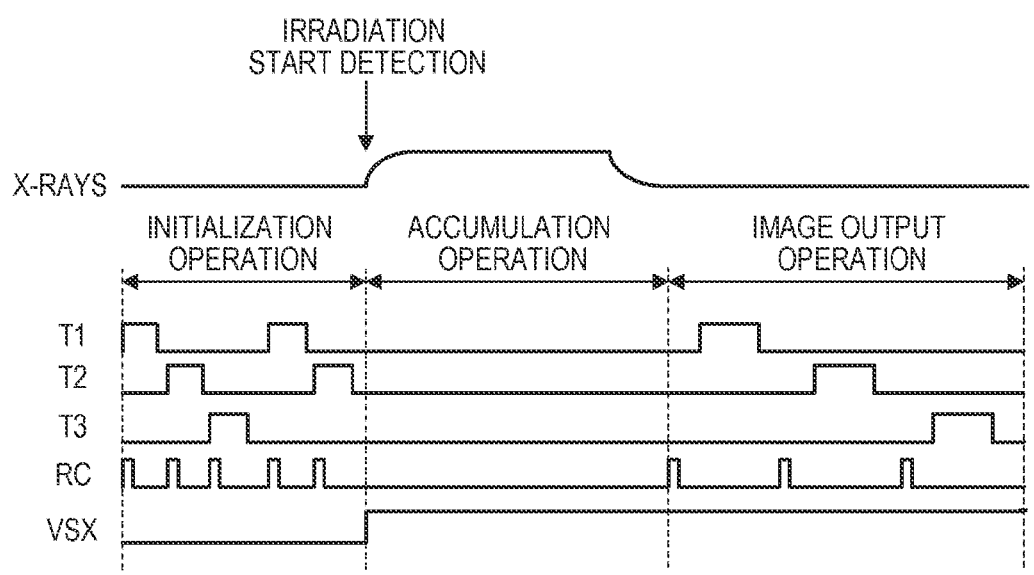

The operation of a radiation imaging apparatus 100 according to the second embodiment of the present invention will be described below with reference to FIG. 4B. Note that matters that are not mentioned below can comply with the first embodiment.

In the second embodiment, a control unit 106 does not detect the end of radiation irradiation based on the output from a detection circuit 120, and instead, ends the accumulation operation after the elapse of a predetermined time from the start of radiation irradiation.

The initialization operation of the second embodiment is the same as that of the first embodiment. During the period of the initialization operation, the control unit 106 performs a detection operation of detecting radiation irradiation to a pixel array 101 using the detection circuit 120. More specifically, during the period of the initialization operation and the accumulation operation, the detection circuit 120 detects a current I_Vs flowing to a bias line Vs, and supplies a bias current signal VSD representing the current to the control unit 106. The control unit 106 detects the start of radiation irradiation to the pixel array 101 based on the bias current signal VSD. The control unit 106 can detect the start of radiation irradiation to the pixel array 101 based on, for example, at least one of the instantaneous value, integrated value, and differential value of the bias current signal VSD. The control unit 106 sets the feedback impedance in the detection operation of detecting radiation irradiation to be higher than that in a readout operation of signals from pixels PIX, as described above. In this example, a switch SWB is opened to disable the third path.

Upon detecting the start of radiation irradiation to the radiation imaging apparatus 100, the control unit 106 supplies a control signal to a driving circuit 102 to stop the initialization operation. Accordingly, the pixels of the pixel array 101 start the accumulation operation. Additionally, upon detecting the start of radiation irradiation to the radiation imaging apparatus 100, the control unit 106 sets a control signal VSX to the active level. In accordance with the change of the control signal VSX to the active level, the detection circuit 120 sets the feedback impedance to that in the readout operation of signals from the pixels PIX. That is, upon detecting the start of radiation irradiation to the radiation imaging apparatus 100, the control unit 106 makes the feedback impedance of the detection circuit 120 low. In this example, the switch SWB is closed to enable the third path.

Hence, in the second embodiment, the control unit 106 cannot detect the end of radiation irradiation to the pixel array 101 based on the output of the detection circuit 120. After the elapse of a predetermined time from the start of the accumulation operation, the control unit 106 considers the radiation irradiation to end and shifts the operation from the accumulation operation to the image output operation. The image output operation of the second embodiment is the same as that of the first embodiment.

Figure 5:
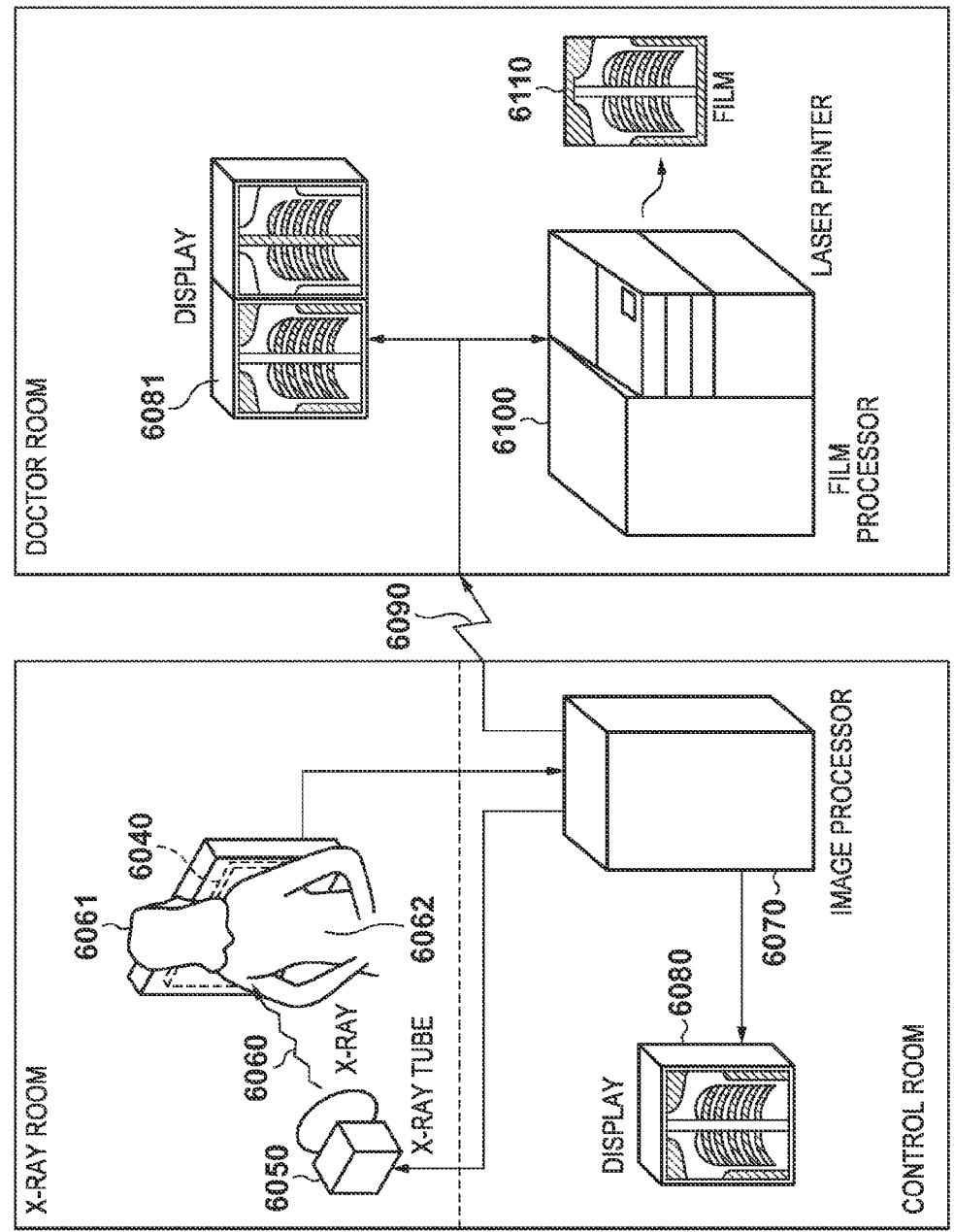
FIG. 5 is a view exemplifying a radiation imaging system.

FIG. 5 is a view showing an example in which the radiation imaging apparatus according to the present invention is applied to an X-ray diagnostic system (radiation imaging system). The radiation imaging system includes a radiation imaging apparatus 6040 (corresponding to the above-described radiation imaging apparatus 100) and an image processor 6070 that processes a signal output from the radiation imaging apparatus 6040. X-rays 6060 generated by an X-ray tube (radiation source) 6050 pass through a chest 6062 of a patient or subject 6061 and enter the radiation imaging apparatus 6040. The X-rays that have entered include the internal information of the subject 6061. The image processor (processor) 6070 can process a signal (image) output from the radiation imaging apparatus 6040 and, for example, displays the image on a display 6080 in the control room based on the signal obtained by the processing.

The image processor 6070 can also transfer the signal obtained by the processing to a remote site via a transmission line 6090. This makes it possible to display the image on a display 6081 arranged in a doctor room in another place or record the image in a recording medium such as an optical disk. The recording medium may be a film 6110. In this case, a film processor 6100 records the image on the film 6110.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-040029, filed Feb. 28, 2013 which is hereby incorporated by reference herein in its entirety.

What is claimed is:

1. A radiation imaging apparatus comprising:
   a pixel array in which a plurality of pixels are arrayed, each of the plurality of pixels including a converter configured to accumulate charges corresponding to radiation;
   a bias line configured to apply a bias potential to the converters of the plurality of pixels;
   a detection circuit configured to detect a current flowing to the bias line; and
   a control unit configured to detect a start of radiation irradiation to the pixel array based on an output from the detection circuit and configured to control a charge accumulation operation of the plurality of pixels in accordance with the detection of the start of radiation irradiation,
   wherein the detection circuit includes a differential amplifier circuit and a feedback path and is configured to apply a potential corresponding to a reference bias potential to the bias line,
   the differential amplifier circuit includes a first input terminal to which the reference bias potential is applied, a second input terminal to which the bias line is connected, and an output terminal, and the feedback path connects the output terminal and the second input terminal, and
   an impedance of the feedback path in a detection operation of detecting radiation irradiation is higher than the impedance of the feedback path in a readout operation of a signal from the pixel array.

2. The apparatus according to claim 1, wherein the control unit controls the impedance of the feedback path based on the output from the detection circuit.

3. The apparatus according to claim 2, wherein the control unit detects an end of radiation irradiation to the pixel array based on the output from the detection circuit, and makes the impedance of the feedback path low in accordance with the detection of the end of radiation irradiation.

4. The apparatus according to claim 3, further comprising a readout circuit configured to read out a signal of a selected pixel out of the plurality of pixels,
   wherein the control unit makes the impedance of the feedback path low during a period in which the readout circuit is reset for the first time after detection of the end of radiation irradiation to the pixel array.

5. The apparatus according to claim 2, wherein the control unit makes the impedance of the feedback path low in accordance with detection of the start of radiation irradiation to the pixel array.

6. The apparatus according to claim 1, wherein the control unit makes the impedance of the feedback path high in accordance with an end of the readout operation.

7. The apparatus according to claim 1, wherein the feedback path includes a plurality of paths that connect the output terminal and the second input terminal, and the control unit controls the impedance of the feedback path by selecting a path to be enabled out of the plurality of paths.

8. The apparatus according to claim 7, wherein the plurality of paths include a path including a resistor and a path formed from an electrically conductive line.

9. The apparatus according to claim 8, wherein the path including the resistor further includes a capacitor connected in parallel to the resistor.

10. The apparatus according to claim 1, wherein the differential amplifier circuit and the feedback path form a current-voltage conversion amplifier, and the detection circuit further includes a voltage amplifier configured to amplify an output of the current-voltage conversion amplifier.

11. A radiation imaging system comprising:

a radiation imaging apparatus as claimed in claim 1; and a processor configured to process a signal output from the radiation imaging apparatus.

* * * * *